US012213042B2

(12) United States Patent
Generes, Jr.

(10) Patent No.: US 12,213,042 B2
(45) Date of Patent: Jan. 28, 2025

(54) SYSTEM OF ACTIONS FOR IOT DEVICES

(71) Applicant: ServiceNow, Inc., Santa Clara, CA (US)

(72) Inventor: Tasker O. Generes, Jr., Chicago, IL (US)

(73) Assignee: ServiceNow, Inc., Santa Clara, CA (US)

( * ) Notice: Subject to any disclaimer, the term of this patent is extended or adjusted under 35 U.S.C. 154(b) by 321 days.

(21) Appl. No.: 17/646,391

(22) Filed: Dec. 29, 2021

(65) Prior Publication Data

US 2022/0124470 A1    Apr. 21, 2022

Related U.S. Application Data

(63) Continuation of application No. 16/658,966, filed on Oct. 21, 2019, now Pat. No. 11,265,693, which is a
(Continued)

(51) Int. Cl.
*H04W 4/70*    (2018.01)
*G06Q 10/06*    (2023.01)
(Continued)

(52) U.S. Cl.
CPC .............. *H04W 4/70* (2018.02); *G06Q 10/06* (2013.01); *H04L 41/0893* (2013.01);
(Continued)

(58) Field of Classification Search
CPC .......... H04W 4/70; H04W 4/80; G06Q 10/06; H04L 41/0893; H04L 41/22;
(Continued)

(56) References Cited

U.S. PATENT DOCUMENTS 5,978,594 A    11/1999    Bonnell
6,321,229 B1    11/2001    Goldman
(Continued)

FOREIGN PATENT DOCUMENTS

CA    2902454 A1    3/2016
WO    2017049439 A1    3/2017

OTHER PUBLICATIONS

Patick Spiess et al.: "SOA-Based Integration of the Internet of Things in enterprise Services", IEEE International Conference on Web Services, Piscataway, NJ, Jul. 6, 2009; pp. 968-975 (XP031497913).

*Primary Examiner* — Jae Y Lee
(74) *Attorney, Agent, or Firm* — Fletcher Yoder P.C.

(57) ABSTRACT

Improving utilization of network devices includes detecting that a first network device is added to a network system comprising a plurality of network devices associated with a service map, wherein at least one of the plurality of network devices corresponds to one or more activities of a workflow for the service map, determining a first activity of the workflow that utilizes data from the first network device, and in response to determining that the first activity of the workflow utilizes data from the first network device, determining sensor attributes of the first network device that are tied to key performance indicators for the first network device, and adding the first network device to the service map such that the determined sensor attributes provide input for the first activity.

20 Claims, 8 Drawing Sheets

Related U.S. Application Data continuation of application No. 15/482,600, filed on Apr. 7, 2017, now Pat. No. 10,492,046.

(51) Int. Cl.
| | |
|---|---|
| *H04L 9/40* | (2022.01) |
| *H04L 41/0893* | (2022.01) |
| *H04L 41/22* | (2022.01) |
| *H04L 41/5009* | (2022.01) |
| *H04L 41/5025* | (2022.01) |
| *H04L 47/10* | (2022.01) |
| *H04L 67/12* | (2022.01) |
| *H04W 4/80* | (2018.01) |
| *H04L 41/12* | (2022.01) |
| *H04L 43/0805* | (2022.01) |

(52) U.S. Cl.
CPC .......... *H04L 41/22* (2013.01); *H04L 41/5009* (2013.01); *H04L 41/5025* (2013.01); *H04L 47/10* (2013.01); *H04L 63/0876* (2013.01); *H04L 63/10* (2013.01); *H04L 63/1433* (2013.01); *H04L 63/145* (2013.01); *H04L 67/12* (2013.01); *H04W 4/80* (2018.02); *H04L 41/12* (2013.01); *H04L 43/0805* (2013.01)

(58) Field of Classification Search
CPC . H04L 41/5009; H04L 41/5025; H04L 47/10; H04L 63/0876; H04L 63/10; H04L 67/12; H04L 41/12; H04L 43/0805
See application file for complete search history.

(56) References Cited

U.S. PATENT DOCUMENTS

| | | | |
|---|---|---|---|
| 6,799,189 B2 | 9/2004 | Huxoll | |
| 6,816,898 B1 | 11/2004 | Scarpelli | |
| 7,027,411 B1 | 4/2006 | Pulsipher | |
| 7,350,209 B2 | 3/2008 | Shum | |
| 7,392,300 B2 | 6/2008 | Anantharangachar | |
| 7,617,073 B2 | 11/2009 | Trinon | |
| 7,685,167 B2 | 3/2010 | Mueller | |
| 7,877,783 B1 | 1/2011 | Cline | |
| 7,890,802 B2 | 2/2011 | Gerber | |
| 7,933,927 B2 | 4/2011 | Dee | |
| 7,941,506 B2 | 5/2011 | Bonal | |
| 7,945,860 B2 | 5/2011 | Vambenepe | |
| 8,082,222 B2 | 12/2011 | Rangarajan | |
| 8,346,752 B2 | 1/2013 | Sirota | |
| 8,380,645 B2 | 2/2013 | Kowalski | |
| 8,554,750 B2 | 10/2013 | Rangaranjan | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Milousheff | |
| 8,818,994 B2 | 8/2014 | Kowalski | |
| 8,907,988 B2 | 12/2014 | Poston | |
| 9,015,188 B2 | 4/2015 | Behne | |
| 9,037,536 B2 | 4/2015 | Vos | |
| 9,137,115 B2 | 9/2015 | Mayfield | |
| 9,261,372 B2 | 2/2016 | Cline | |
| 9,323,801 B2 | 4/2016 | Morozov | |
| 9,412,084 B2 | 9/2016 | Kowalski | |
| 9,467,344 B2 | 10/2016 | Gere | |
| 9,534,903 B2 | 1/2017 | Cline | |
| 9,613,070 B2 | 4/2017 | Kumar | |
| 9,631,934 B2 | 4/2017 | Cline | |
| 9,659,051 B2 | 5/2017 | Hutchins | |
| 9,792,387 B2 | 10/2017 | George | |
| 9,852,165 B2 | 12/2017 | Morozov | |
| 9,967,162 B2 | 5/2018 | Spinelli | |
| 10,002,203 B2 | 6/2018 | George | |
| 2013/0174259 A1* | 7/2013 | Pearcy | H04L 63/20 726/25 |
| 2016/0381030 A1* | 12/2016 | Chillappa | H04W 4/38 726/11 |
| 2017/0105095 A1 | 4/2017 | Um et al. | |
| 2017/0132194 A1 | 5/2017 | Lee | |
| 2017/0187807 A1 | 6/2017 | Clemon | |
| 2017/0288955 A1* | 10/2017 | Yin | H04L 43/0817 |
| 2018/0060153 A1* | 3/2018 | Innes | H04L 41/06 |
| 2018/0139227 A1* | 5/2018 | Martin | H04L 63/1433 |
| 2018/0316698 A1* | 11/2018 | David | H04L 63/1441 |

\* cited by examiner

SYSTEM OF ACTIONS FOR IOT DEVICES

CROSS-REFERENCE TO RELATED APPLICATION

This application is a continuation of U.S. patent application Ser. No. 16/658,966, filed on Oct. 21, 2019, entitled "SYSTEMS OF ACTIONS FOR IOT DEVICES," which is a continuation of and claims priority to U.S. patent application Ser. No. 15/482,600, filed on Apr. 7, 2017 (now U.S. Pat. No. 10,492,046), entitled "SYSTEMS OF ACTIONS FOR IOT DEVICES," both of which are herein incorporated by reference in their entirety.

TECHNICAL FIELD

Embodiments described herein generally relate to network computing and in particular for creating and executing flow plans utilizing IoT devices.

BACKGROUND ART

Today's technology allows computer networks any number of computer devices. Such devices may include, for example, personal computers, laptops, television devices, cell phones, tablets, smart watches, and other devices. In addition, the rise of Internet of Things (IoT) devices allows for the connection of a number of devices not typically considered computing devices, such as medical devices, children's toys, home appliances, wearable devices, turbines, and any number of other items that may contain some kind of data activity.

One of the benefits of IoT devices is that they are easily deployable. Many IoT devices may be inserted into a preexisting system. The functionality of a particular IoT device may compliment devices already existing in the network. Within the context of automating enterprise, IT, and/or other organization-related functions (e.g., human resources (HR)), platform as a service (PaaS) often provide users an array of tools to implement complex behaviors, such as enterprise rules, scheduled jobs, events, and scripts, to build automated processes and to integrate with third party systems. The rise of IoT devices has brought numerous new ways that processes may be automated. As such, continually improving the technology of developmental platforms that simplify the process for a user to run automated processes remains valuable in enhancing network services.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method for improving utilization of network devices is described. The method may include Improving utilization of network devices includes detecting that a first network device is added to a network system comprising a plurality of network devices associated with a service map, wherein at least one of the plurality of network devices corresponds to one or more activities of a workflow for the service map, determining a first activity of the workflow that utilizes data from the first network device, and in response to determining that the first activity of the workflow utilizes data from the first network device, determining sensor attributes of the first network device that are tied to key performance indicators for the first network device, and adding the first network device to the service map such that the determined sensor attributes provide input for the first activity.

In another embodiment, the method may be embodied in computer executable program code and stored in a non-transitory storage device. In yet another embodiment, the method may be implemented in a network system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
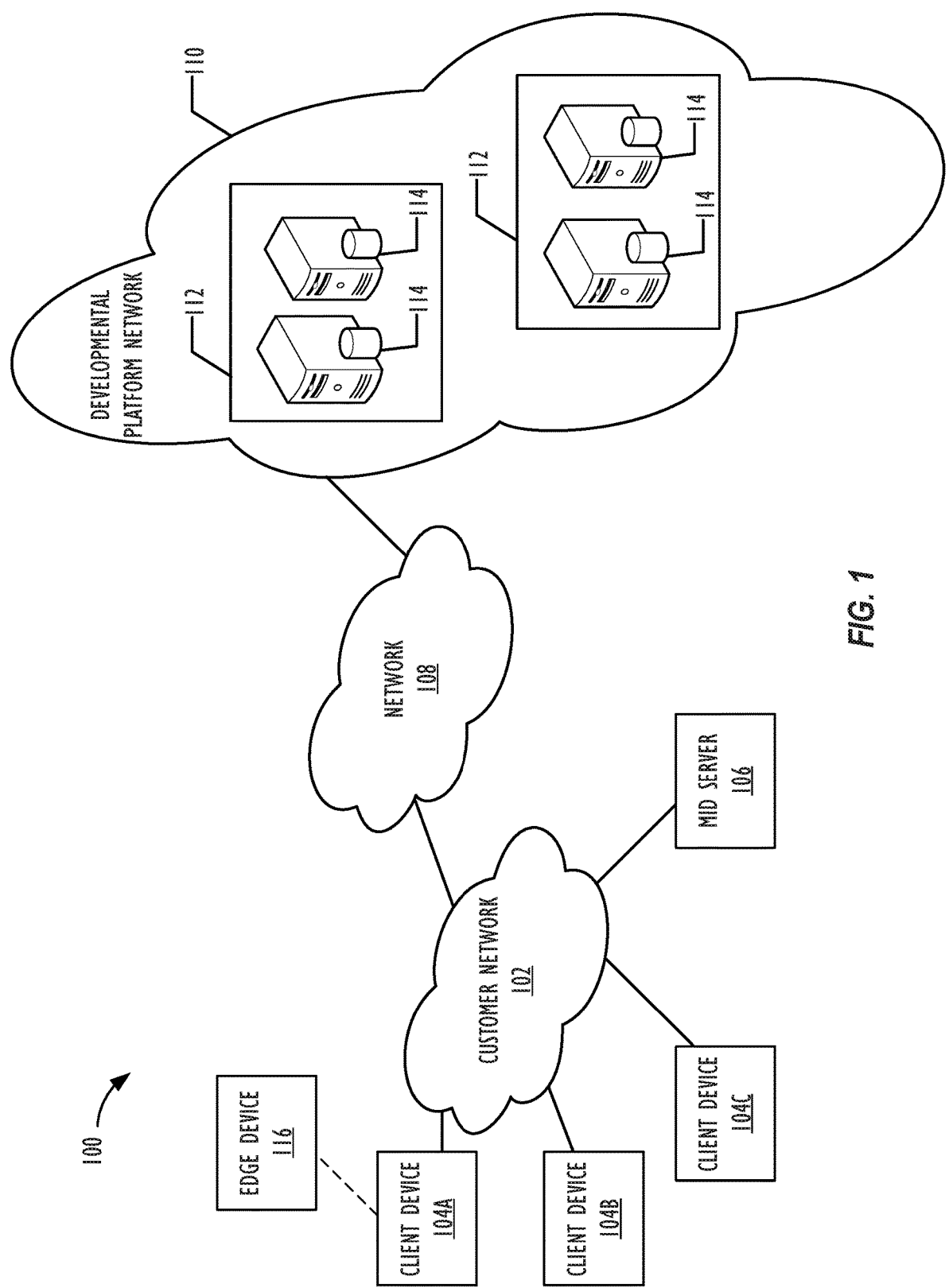
FIG. 1 is a schematic diagram of an embodiment of a network computing system where embodiments of the present disclosure may operate herein.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to one embodiment or to an embodiment means that a particular feature, structure, or characteristic described in connection with the embodiments is included in at least one embodiment.

The terms a, an, and the are not intended to refer to a singular entity unless explicitly so defined, but include the general class of which a specific example may be used for illustration. The use of the terms a or an may therefore mean any number that is at least one, including one, one or more, at least one, and one or more than one. The term or means any of the alternatives and any combination of the alternatives, including all of the alternatives, unless the alternatives are explicitly indicated as mutually exclusive. The phrase at least one of when combined with a list of items, means a single item from the list or any combination of items in the list. The phrase does not require all of the listed items unless explicitly so defined.

As used here, the term computing device may refer to a device that includes, but is not limited to a single computer, host, server, laptop, and/or mobile device.

As used herein, the term network device may refer to any device that is capable of communicating and transmitting data to another device across any type of network.

As used herein, the term computing system may refer to a single electronic computing device or network device that includes, but is not limited to a single computer, virtual machine, virtual container, host, server, laptop, and/or mobile device. The term computing system may also refer to a plurality of electronic computing devices and/or network devices working together to perform the function described as being performed on or by the computing system.

As used herein, the term medium refers to one or more non-transitory physical media that together store the contents described as being stored thereon. Embodiments may include non-volatile secondary storage, read-only memory (ROM), and/or random-access memory (RAM).

As used herein, the term application refers to one or more computing modules, programs, processes, workloads, threads and/or a set of computing instructions executed by a computing system. Example embodiments of an application include software modules, software objects, software instances and/or other types of executable code.

Various example embodiments are disclosed herein that create and execute workflows for a service within a network environment. To create and execute workflows, activities within the workflow are tied to network components and other devices utilized to perform the activity. The result may be a service map that ties components of services to sensor data collected by distributed network devices, such as IoT devices. By tying various activities within a workflow to network devices, the workflow and service map may be managed in a more efficient manner. As an example, at least part of the workflow may be automated based on the received sensor data. Further, as another example, predictions may be made regarding future needs of assets utilized to perform a service based on an analysis of the data received from the distributed network devices. Moreover, in one or more embodiments, the data received from the network devices may be utilize to determine a health score for one or more components of a system, or a remote system with similar components or architecture. One or more embodiments enable the disruption caused by network devices, such as internet of things devices, to promote ideation leading to the demand in new services and models and leveraging the platform to enable the consumption of those new services.

FIG. 1 is a schematic diagram of an embodiment of a computing system 100, such as a cloud computing system, where embodiments of the present disclosure may operate herein. Computing system 100 may include a customer network 102, network 108, and developmental platform network 110. In one embodiment, the customer network 102 may be a local private network, such as local area network (LAN) that includes a variety of network devices that include, but are not limited to switches, servers, and routers. In another embodiment, the customer network 102 represents an enterprise network that could include one or more local area networks (LANs), virtual networks, data centers 112 and/or other remote networks. As shown in FIG. 1, the customer network 102 is able to connect to one or more client devices 104A-C so that the client devices are able to communicate with each other and/or with the developmental platform network 110. The client devices 104A-C may be computing systems and/or other types of computing devices generally referred to as Internet of Things that access cloud computing services, for example, via a web browser application or via an edge device 116 that may act as a gateway between the client device and the remote device. FIG. 1 also illustrates that the customer network 102 includes a management, instrumentation, and discovery (MID) servers 106 that facilitate communication of data between the developmental platform network 110, other external applications, data sources, and services, and the customer network 102. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to a network 108. The network 108 may include one or more computing networks available today, such as other LANs, wide area networks (WAN), the Internet, and/or other remote networks, in order to transfer data between the client devices 104A-C and the developmental platform network 110. Each of the computing networks within network 108 may contain wired and/or wireless programmable devices that operate in the electrical and/or optical domain. For example, network 108 may include wireless networks, such as cellular networks (e.g., Global System for Mobile Communications (GSM) based cellular network) wireless fidelity (Wi-Fi®) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the developmental platform network 110 may be a remote network (e.g., a cloud network) that is able to communicate with the client devices 104A-C via the customer network 102 and network 108. The developmental platform network 110 acts as a platform that provides additional computing resources to the client devices 104A-C and/or customer network 102. For example, by utilizing the developmental platform network 110, users of client devices 104A-C are able to build and execute applications, such as automated processes for various enterprise, IT, and/or other organization-related functions. In one embodiment, the developmental platform network 110 includes one or more data centers 112, where each data center 112 could correspond to a different geographic location. Within the data center 112 include a plurality of server instances 114. Each server instance 114 can be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java Virtual Machine), and/or a database server instance (e.g., a unitary My SQL catalog).

To utilize computing resources within the developmental platform network 110, network operators may choose to configure the data centers 112 using a variety of computing infrastructures. In one embodiment, one or more of the data centers 112 are configured using a multi-tenant cloud architecture such that a single server instance 114, which can also be referred to as an application instance, handles requests and serves multiple customers. In other words, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. Generally, implementing a multi-tenant cloud architecture suffer drawbacks, such as a failure to single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the developmental platform network 110, and customer-driven upgrade schedules.

Figure 2:
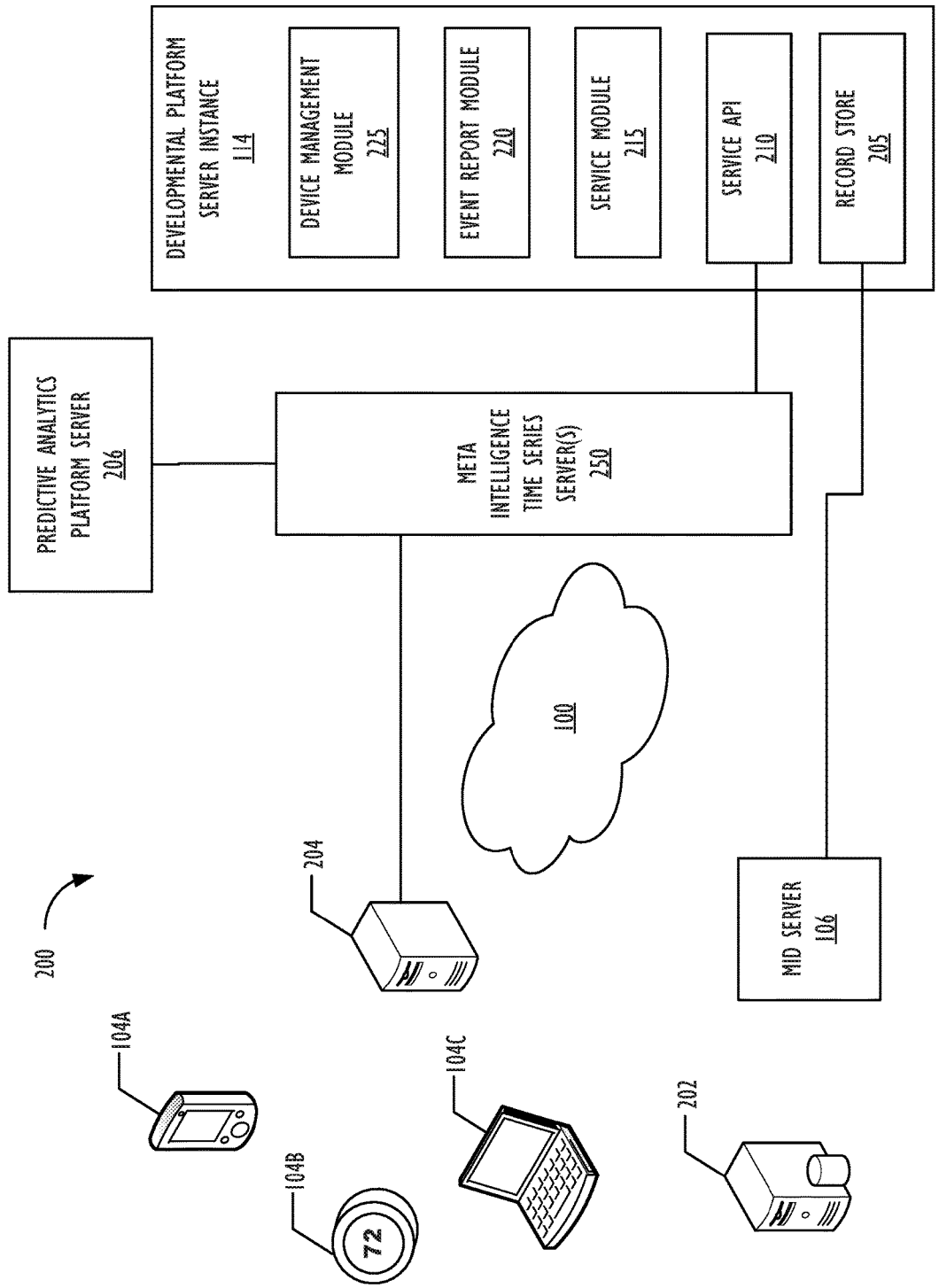
FIG. 2 is a schematic diagram of an embodiment of a network architecture where embodiments of the present disclosure may operate herein.

FIG. 2 illustrates a more specific network implementation for the use of a system of actions for network devices. Network architecture 200 includes many of the components depicted in FIG. 1. For purposes of example, the various client devices 104 may include different types of network devices, such as tablet devices, laptop computers, and any kind of device that produces data, such as the thermostat shown, often referred to as Internet of Things (IoT) devices. According to one or more embodiments, the various network devices 104 may be discovered, managed, and/or monitored by MID server 106. In one or more embodiments, the client-side devices may include additional components, such as a database server 202, which may store data, such as data generated by the client devices 104. As depicted in architecture 200, the network system may also include one or more broker gateways 204 that may communicate with the various network devices using various protocols. For example, broker gateway 204 may communicate with the client devices 14 using Message Queue Telemetry Transport (MQTT), Wifi® (WIFI is a registered trademark of Wi-Fi Alliance), Bluetooth® (BLUETOOTH is a registered trademark of Bluetooth Special Interest Group), and Near Field Communication (NFC).

As depicted, another component in the network architecture according to one or more embodiments is the meta intelligence time series server(s) 250. According to one or more embodiments, the meta intelligence time series server(s) 250 provides an abstraction layer allowing the developmental platform server instance 114 to utilize the data. In one or more embodiments, the meta intelligence time series server(s) 250 may manage the data generated by client devices 104 to identify data useful for a particular service. For example, the meta intelligence time series server(s) 250 may tie a service map to critical assets, such as client devices 104. Further, in one or more embodiments, the meta intelligence time series server(s) may tie client devices 104 to the developmental platform server instance 114 to manage a business process workflow by tying the process to a service map of critical assets, such as the client devices 104. The sensor data from the client devices 104 may be filtered to detect data useful for the workflow.

According to one or more embodiments, the development platform server instance 114 may include one or more components utilized to implement the system of actions for network devices. The development server instance 114 may be operatively coupled to a meta intelligence layer, such as the meta intelligence time series server(s) 250, using a web service API 210 (e.g., Representational state transfer (REST) API). The one or more components within 114 may be computer readable code stored on a non-transitory memory and executable by one or more processors. For example, the development platform server instance may include a record store, which may include data received from the MID server 106 regarding the client devices 104. In one or more embodiments, the record store 205 may receive data from the database server 202.

According to one or more embodiments, the development platform server instance 114 may also include a service module 215. The service module 215 may manage service issues. As an example, service module 215 may receive information about service issues and service orders and feed the service data into a service map. The service module 215 may also automatically or dynamically trigger actions in a workflow when the needed data for a particular action is received from client devices 104. In one or more embodiments, service module 215 may structure and automate workflows to streamline service delivery and service recovery. Further, in one or more embodiments, service module 215 may provide a service portal, such as a graphical user interface, for users to manage the services and security of the client devices from vulnerability and threat. Additionally the service module 215 may structure demand management to handle efficiency and growth of services and workflows. Finally the service module 215 may also channel demand to handle new applications that provide additional services tied to client devices 104 which may change the utilization of those devices. The developmental platform server instance 114 may also include a device management module 225. The device management module 225 may be utilized to manage an architecture of client devices 225 and data received therefrom. For example, device management module 225 may manage client devices 104 as configuration items and assets. Device management module 225 may also map relationship between client devices 104 and services. In addition, in one or more embodiments, device management module 225 may also analyze the service workflow based on the sensor data received from client devices 104 to determine a business value of the network devices 104, as well as various levels of priority and availability of the client devices 104. Device management module 225 may further analyze performance metrics of a service based on the received data in order to determine information about system and device health, and comparative measures with integrated key performance indicators (KPIs).

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that the developmental platform network 110 is implemented using data centers, other embodiments of the of the developmental platform network 110 are not limited to data centers and can utilize other types of remote network infrastructures. Moreover, other embodiments of the present disclosure may combine one or more different server instance into a single server instance. Using FIG. 2 as an example, the functionality of the meta intelligence time series server(s) 250 and the developmental platform server instance 114 may be combined into a single instance, or may be distributed across additional devices, such servers, client devices, or edge devices, or instances. The use and discussion of FIGS. 1 and 2 are only examples to facilitate ease of description and explanation.

Figure 3:
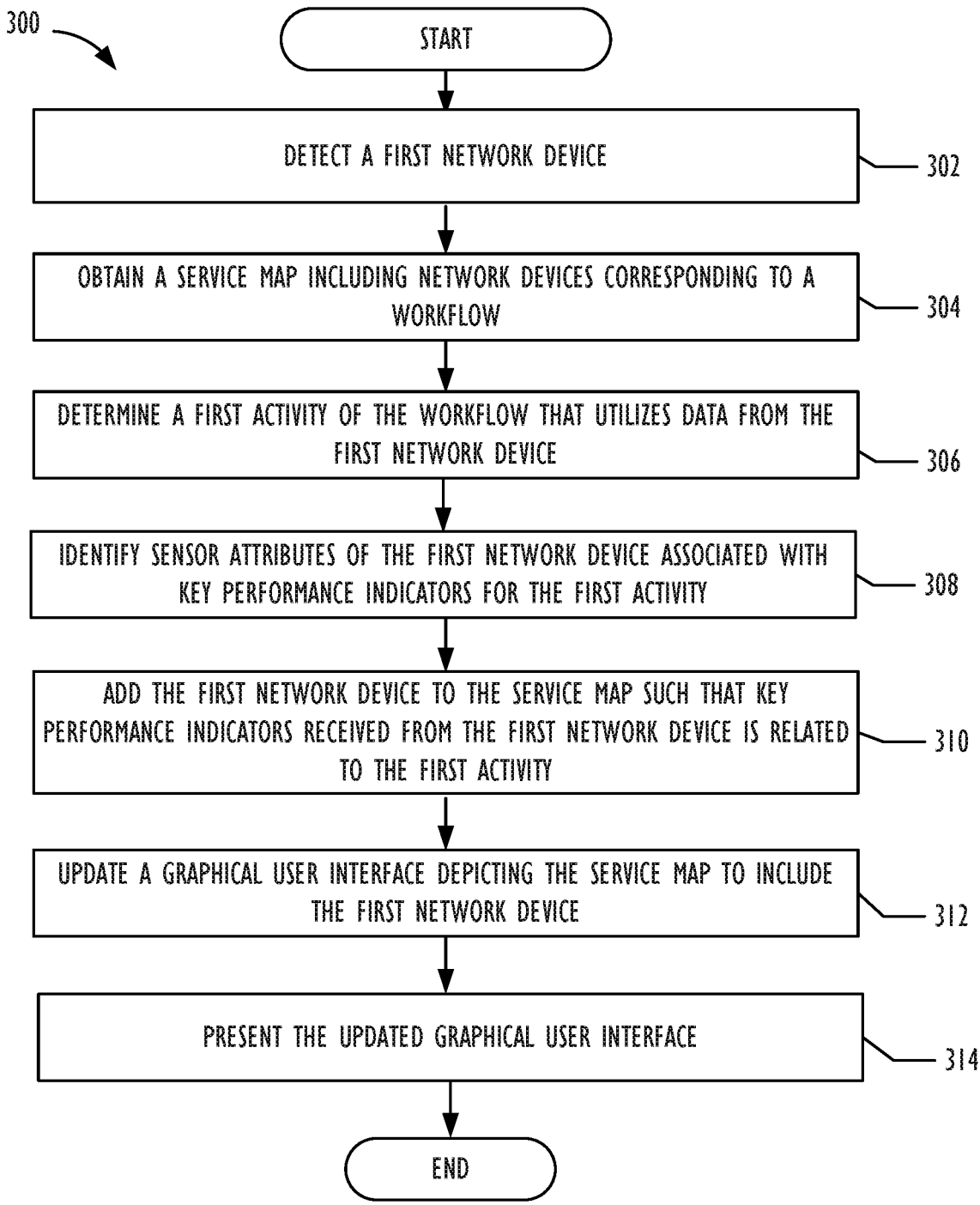
FIG. 3 is a flowchart illustrating a method for managing network devices in relation to a service map.

FIG. 3 is a flowchart illustrating a method for managing network devices in relation to a service map. According to one or more embodiments, a service map may identify assets, such as client devices 104, and tie the assets to a business process or processes. In one or more embodiments, the business process may be expressed in the form of a workflow. A workflow may define the business process as a set of activities.

The flowchart 300 begins at 302, and a first network device is detected. In one or more embodiments, the first network device may be detected by the MID server 106. In addition to detecting the device, characteristics of the device may also be determined. For example, in one or more embodiments, sensor attributes for the client devices 104. Based on the sensor attributes, a type of data may be determined. According to one or more embodiments, the first network device may be secured at this time. For example, the first network device may be scanned for malware, registered with a security operation module, or otherwise managed such that processes executed on the device and/or data transmitted to/from the device are monitored.

The flowchart 300 continues at 304, and the service map is obtained that includes network devices corresponding to a workflow. As described above, the service map may indicate a map of devices and other assets, such as client devices 104. The service map may correspond to a service, or a workflow for a service. As described above, a workflow may include one or more activities corresponding to the assets. The flowchart 300 continues at 306, and the system determines a first activity of the workflow that utilizes data from the first network device. According to one or more embodiments, the first activity may be determined based on a type of data or a type of device. As an example, a sensor on a printer that detects ink levels may be associated with an activity to obtain additional printer data. Further, a combination of sensors in multiple client devices may be considered.

The flowchart 300 continues at 308, and sensor attributes of the first network device are identified that are associated with key performance indicators related to the first activity.

To expand on the printer example above, the key performance indicator for a printer might include data regarding ink levels or data regarding performance or sluggishness of a printer, such as pages per minute and the like. Further, the key performance indicator may be relate to the network environment as a whole associated with the workflow, such as a fleet of printers located among multiple stores.

At 310, the flowchart 300 continues, and the first network device is added to the service map. The first network may be added such that the first device is associated with the first activity in the service map.

The flowchart 300 continues at 312, and a graphical user interface depicting the service map to include the first network device. In one or more embodiments, the updated graphical user interface may indicate that the first network device is associate with the first activity of the workflow. According to one or more embodiments, the graphical user interface may provide a view of the assets for a particular service.

The flowchart 300 concludes at 314, and the updated graphical user interface is presented to a user. According to one or more embodiments, the graphical user interface may be utilized by a use to manage the workflow, and the network devices associated with the workflow.

Figure 4:
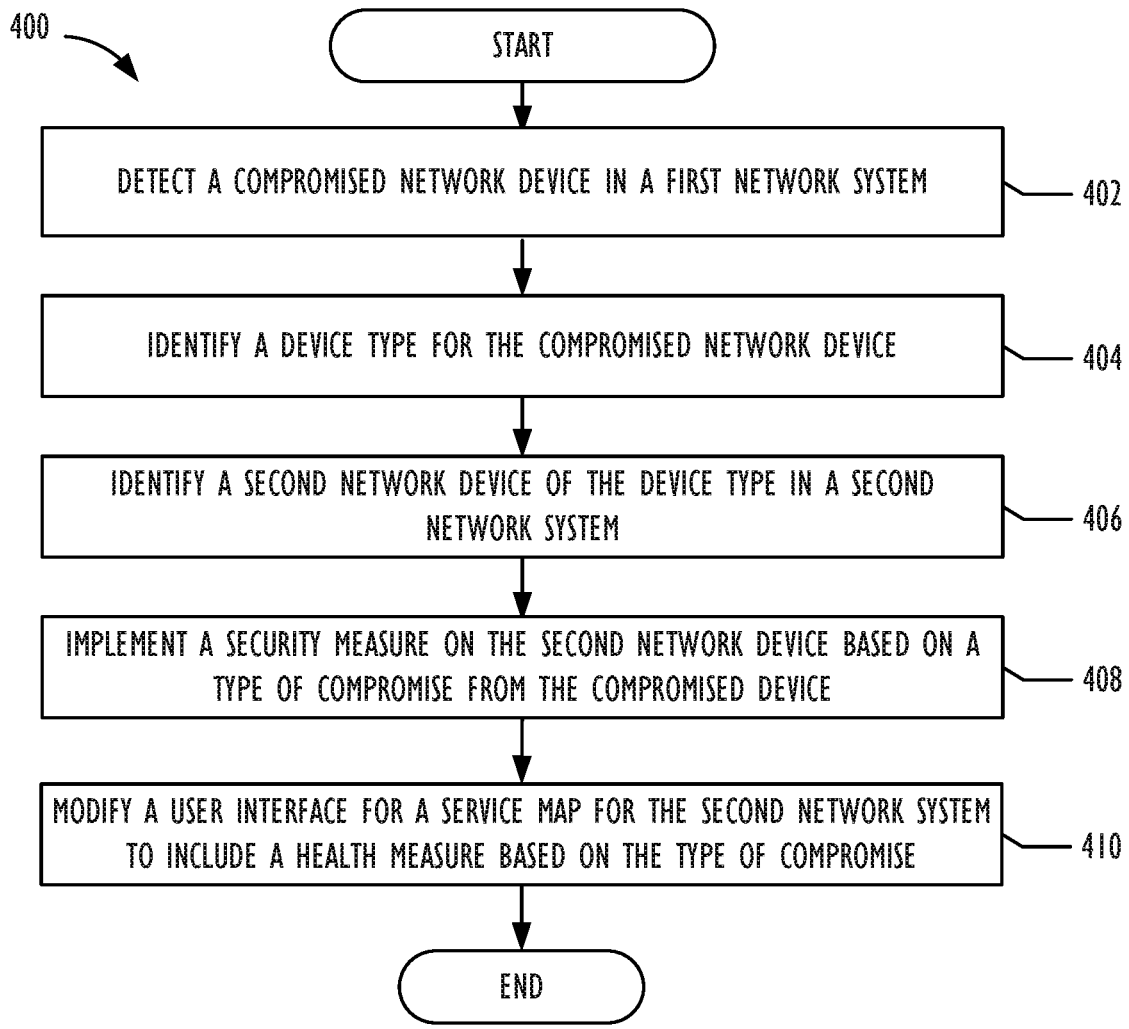
FIG. 4 depicts a flowchart illustrating a method for monitoring health of a network device.

FIG. 4 depicts a flowchart illustrating a method for monitoring health of a network device. The flowchart 400 begins at 402, where a compromised network device is detected in a first network system. According to one or more embodiments, a network device may be determined to be compromised based on data the network device is producing. The network device may be determined to be compromised if it is found to include malware, or if an emerging threat of malware is detected with respect to the device.

The flowchart 400 continues at 404, and a device type is identified for the compromised network device. In one or more embodiments, the device type may be determined based on a discovery message received by the device, or sensor data transmitted by the network device. The device type may indicate a particular functionality of the device. Alternatively, or additionally, the device type may include other kinds of information regarding the device, such as identifying information. In one or more embodiments, the device type may identify a make and/or model of a particular device, or a configuration of the device.

The flowchart 400 continues at 406 and a second network device of the device time is identified in a second network system. As an example, the developmental platform network 110 of FIG. 1 may manage several different network systems associated with different services or even different parties. In one or more embodiments, developmental platform network 110 may include a map of all of the components from which it is receiving data for the various instances 114. Thus, the devices may be cross-referenced to identify matches between the device types.

The flowchart 400 continues at 408, a security measure is implemented on the second network device based on a type of compromise from the compromised device. According to one or more embodiments, the security measure may include generating and transmitting a message to a user regarding the potentially compromised device. In one or more embodiments, the security measure may include updating resources such as firmware on the second device, quarantining the second network device or deploying antimalware to address potential security issues on the device. The flowchart 400 concludes at 410, and a user interface for a service map corresponding the second network system is modified to include a health measure based on the type of compromise.

According to one or more embodiments, the health of a device may be determined based on a type of issue that is presumed based on the analysis at 404 and 406. Further, in one or more embodiments, the health of the network system may also be determined. As an example, the health of the system may be based, in part, on how critical the presumed compromised device is to the service.

With respect to the above flowcharts, it should be understood that the various steps may be performed in an alternate manner. For example, the various steps may be performed by different components than those described with respect to FIG. 3 and FIG. 4. Further, the various steps may be performed in a different order. Some steps may be performed in parallel, and some may be left out altogether, according to one or more embodiments.

Figure 5A:
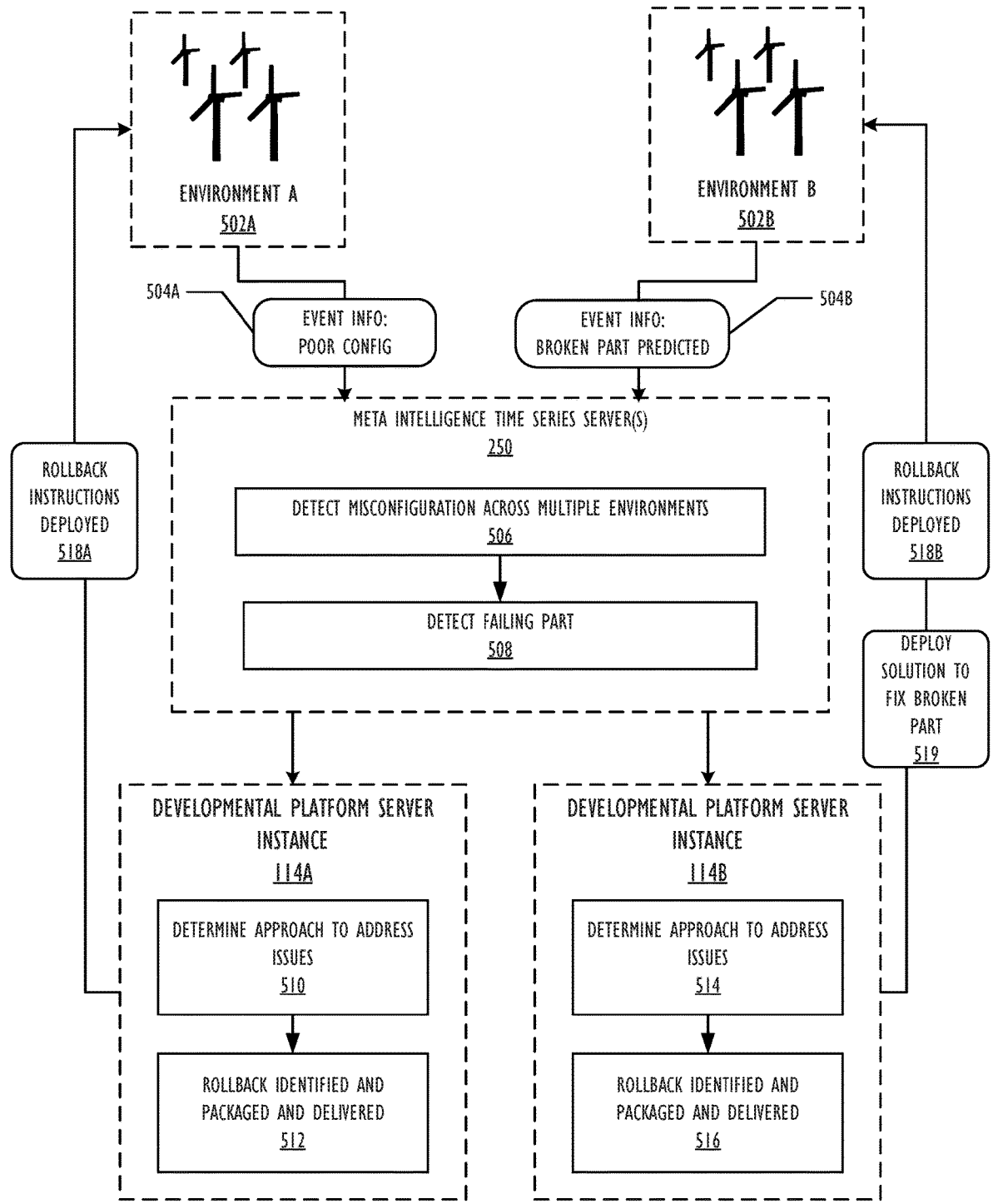
FIG. 5A illustrates an example flow diagram for providing resilience in a service flow using network devices, according to one or more embodiments.
Figure 5B:
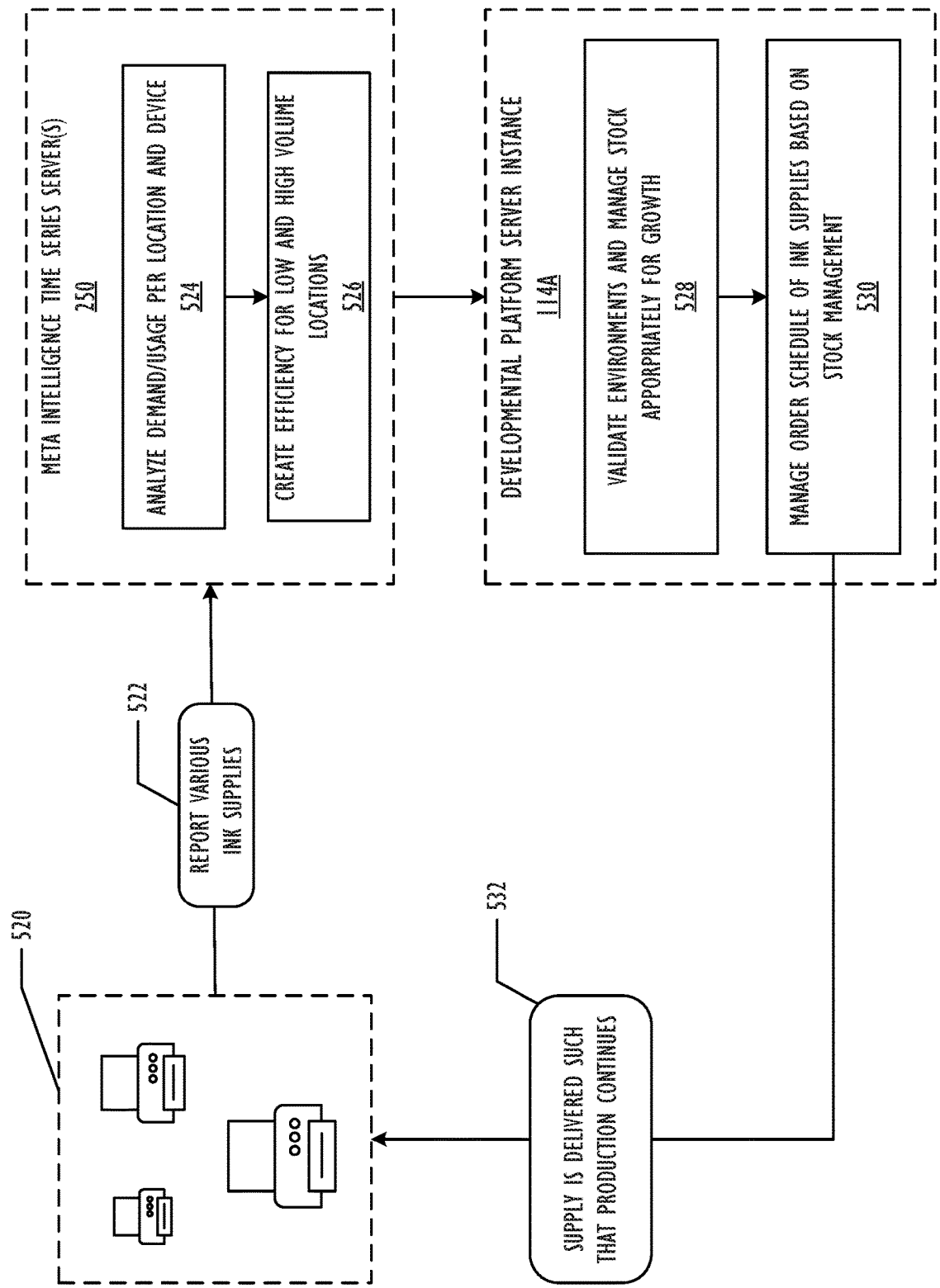
FIG. 5B illustrates an example flow diagram for identifying what is happening while also enabling efficiency and growth in a service flow using network devices, according to one or more embodiments.
Figure 5C:
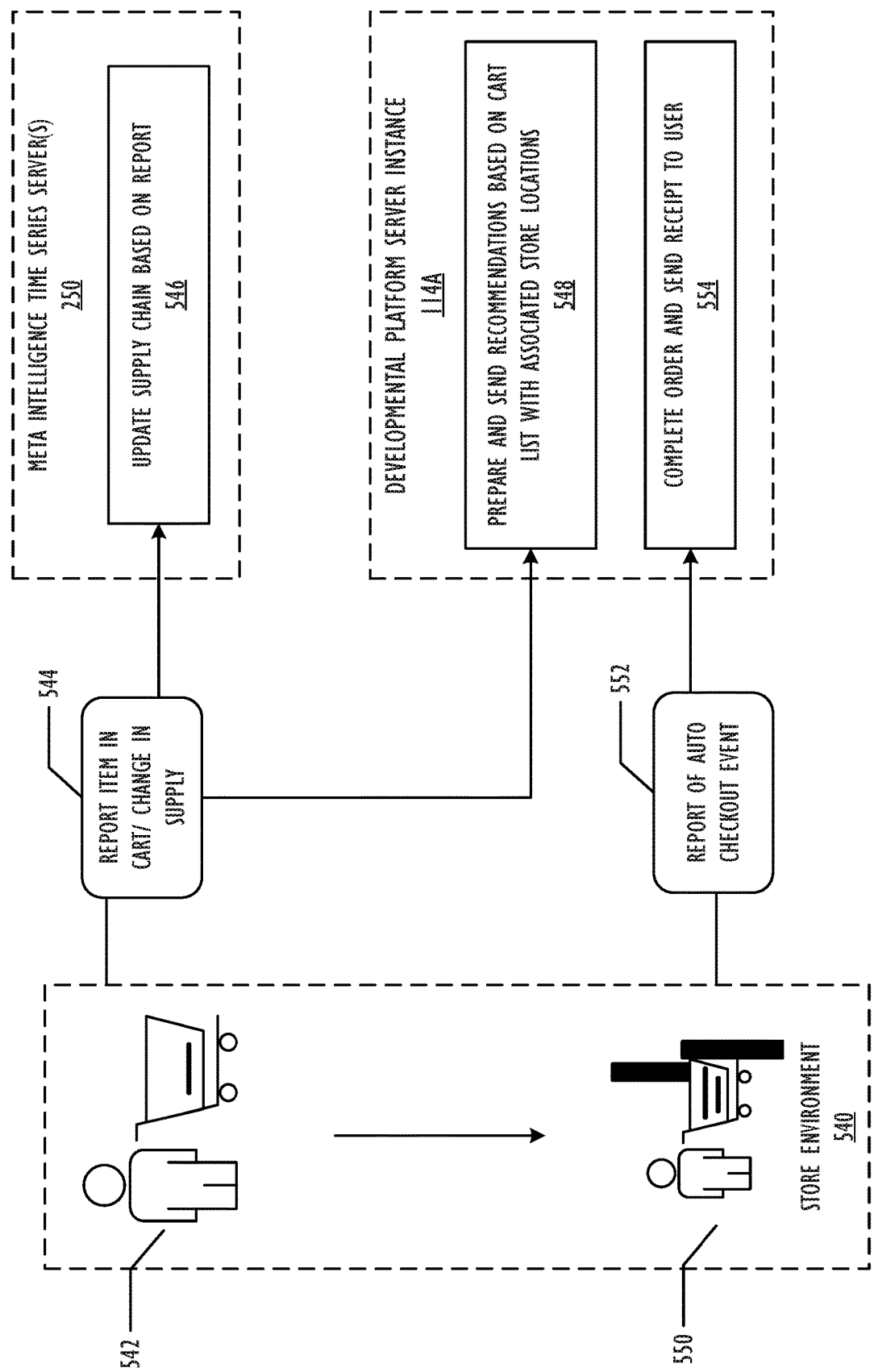
FIG. 5C illustrates an example flow diagram for providing evolving service solutions in a service flow using network devices, according to one or more embodiments.

FIGS. 5A-C illustrate example flow diagrams for managing a service flow using network devices, according to one or more embodiments. The three flow diagrams are directed to different examples for a system of actions for network devices. It should be understood that the flow diagrams of FIGS. 5A-C are depicted merely as examples, and are not necessarily intended to limit the scope of the description. Further, the various functionality described with respect to each component may alternatively be distributed differently across the system, or may be implemented by additional devices not shown.

FIG. 5A illustrates an example flow diagram for providing resilience in a service flow using network devices, according to one or more embodiments. FIG. 5A illustrates an example use case for automated actions based on distributed sensor data from two sets of turbines (502A and 502B). Problems in the turbines may be predicted and addressed with no or reduced human intervention. The flow diagram begins at 504A and 504B, where network devices, such as the turbines in environment A 502A and environment B 502B, may transmit data indicating how well the engine is working. For purposes of clarity, the turbine may be a client device 104, as shown in FIG. 2. As depicted, in the example of FIG. 5A, one or more of the turbines from environment A 502A may transmit data that indicates that one or more turbines is poorly configured, in a message 504A. Similarly, one or more turbines from environment B 502B may transmit an indicating 504B that includes event information indicating that a turbine part is expected to break in the near future.

The flow diagram continues at 506 and the meta intelligence time series server(s) 250 detects the misconfiguration of the turbines across multiple environments. According to one or more embodiments, an event console may be updated with the misconfiguration of the turbines, and/or the indication that a part will soon need to be replaced. Further, according to one or more embodiments, the meta intelligence time series server(s) 250 may not receive events identifying the misconfiguration from every environment. For example, the meta intelligence time series server(s) 250 may only receive the event information 504A, and not event information 504B, although the poor configuration may affect turbines in both environments. Accordingly, the meta intelligence time series server(s) 250 may determine that data from one environment may be appropriate for other environments. The flow diagram may continue at 508, and the meta intelligence time series server(s) 250 may detect the failing part, and determine for how much longer the failing part will be functional. Further, in one or more embodiment, the meta intelligence time series server(s) 250 may modify a workflow for environment B 502B indicating the impending change in inventory of the part.

The flow diagram may continue at 510, and the development platform server instance 114A may determine an approach for addressing the poor configuration. For purposes of this example, development platform server instance 114A may be associated with environment A 502A. According to one or more embodiments, the approach may be determined for additional network devices on top of those for which the event information was received, such as turbines other than the one reporting the issue. For purposes of this example, the determined approach may be a rollback to previous network device configuration settings. Then, at 512, the rollback may be identified and delivered. At 518A, the rollback instructions are deployed to the appropriate turbines in the corresponding environments.

The flow diagram also includes problems being addressed by developmental platform server instance 114B, which may correspond to environment B 502B. Returning to 508, the flow diagram may also proceed to 514, and the developmental platform server instance 114B may determine an approach to address the issues. According to one or more embodiments, the developmental platform server instance may determine an approach similar to that determined in 510, to roll back the configuration. That is, although the issue did not arise from environment B 502B, the solution may be determined based on data the meta intelligence time series server(s) 250 received from environment A 502A. Thus, a problem and solution may be predicted. At 514, the developmental platform server instance 114B may also determine an approach to address the impending broken part. For example, the developmental platform server instance 114B may trigger the part to be ordered in enough time to be received and replaced prior to the part malfunctioning or breaking. The flow diagram continues at 516, and the developmental platform server instance 114B identifies the rollback and packages and delivers the solution to both the known problem of the impending broken part, and the predicted problem of the poor configuration. At 518B, the rollback instructions are deployed, and at 519, the solution to fix the broken part, such as an order to a vendor, is deployed. Thus, the service may continue with limited downtime, as the solution may be automated. Further, an issue may be predicted and addressed based on event information arising out of remote environments. Moreover, notifications may be automatically sent to appropriate team members of the incident, without requiring any action by the team members.

FIG. 5B illustrates an example flow diagram for identifying what is happening while also enabling efficiency and growth in a service flow using network devices, according to one or more embodiments. According to one or more embodiments, the printers may include sensors indicating how full the ink in machine is. The printers may transmit that data indicating when the printer will be empty, thus allowing for predictive refill. The flow diagram begins at 522, where one or more reports, alerts, or events, are transmitted from one or more of a fleet of printers 520, indicating various ink supplies for the printers. Although the printers are shown in a single environment, it should be understood that the printers may be distributed among multiple locations, such as multiple stores for a particular entity. The report, alert, or event, 522 may be received by the meta intelligence time series server(s) 250. The meta intelligence time series server(s) 250 may, at 524, analyze the demand and/or usage of ink supplies per location and device. For example, the meta intelligence time series server(s) 250 may determine, based on a rate of reduction of ink supplies and production at various locations and/or by various individual machines, and an associated requirement for/inventory of ink supplies. The flow diagram continues at 526, and the meta intelligence time series server(s) 250 create an efficiency for low and high volume locations, for example. In one or more embodiments, the efficiency may include, for example, updating ongoing orders from suppliers to ensure that enough supplies are ordered to maintain production without resulting in excess inventory. Based on experience, the demand and usage may be captured and analyzed in order to determine an efficiency, for example, for low and high volume stores. In addition, according to one or more embodiments, service growth and/or reduction options may be identified. As an example, a store with a low volume may need fewer printers, or a high volume store may grow its services by acquiring more printers.

The flow diagram continues at 528, and a developmental platform server instance 114A validates environments manage stock appropriately for growth. As an example, at 530, the developmental platform server instance 114A may manage an order schedule of ink supplies based on stock management in order to deliver supplies in time to ensure that production is uninterrupted. The flow diagram continues at 532, and the updated supply is delivered for the fleet of printers 520. According to one or more embodiments, a notification may be sent to a team member regarding the updates to the workflow, without requiring the team member to take action regarding the updates to the workflow. The result is the printers may be refilled and managed more efficiently.

FIG. 5C illustrates an example flow diagram for providing evolving service solutions in a service flow using network devices, according to one or more embodiments. The flow diagram begins at 544, and a report, such as an alert or event, is transmitted from a client device, such as a smart shopping basket, that an item has been placed in a shopping basket in a store 540. The flow diagram continue at 546 and the meta intelligence time series server(s) 250 update a supply chain based on the report. As an example the meta intelligence time series server(s) 250 may track an inventory at a particular store, as well as turnover statistics regarding items provided for sale at the store 540. As described above, the meta intelligence time series server(s) 250 may analyze use and demand to update and improve efficiencies for the store 540.

The report, alert, or event, may also be sent to a developmental platform server(s) 250. The developmental platform server instance 114A may manage a cart list, which may include items detected as being placed in the shopping basket. At 548, the developmental platform server instance 114A may prepare and send recommendations back to the user at 542 based on a cart list. The recommendations may be based on, for example, historic purchases from the same user, or purchase histories from other users with similar shopping habits. Further, in one or more embodiments, the developmental platform server instance 114A may provide location information within the store environment 540 for each item in the recommendations.

After the user has completed filling the basket or otherwise collecting items for purchase, at 550, the user may check out by simply walking the basket through a gate. The gate may detect that the basket is passing through, and at 552, transmit a report, alert, or event, to the developmental platform server instance 114A indicating the automatic checkout event. The flow diagram continues at 554, and the developmental platform server instance 114A ma complete the order and send the receipt to the user. That is, in one or more embodiments, the developmental platform server instance 114A may access payment data for the user and automatically charge each item in the cart list to the user. Further, the developmental platform server instance 114A may transmit a receipt to the user, including, for example, the cart list and the method of payment. According to one or more embodiments, because of the automation, loss prevention measures may be reduced. In addition, modifications to the supply chain may occur on demand, in real time.

Figure 6:
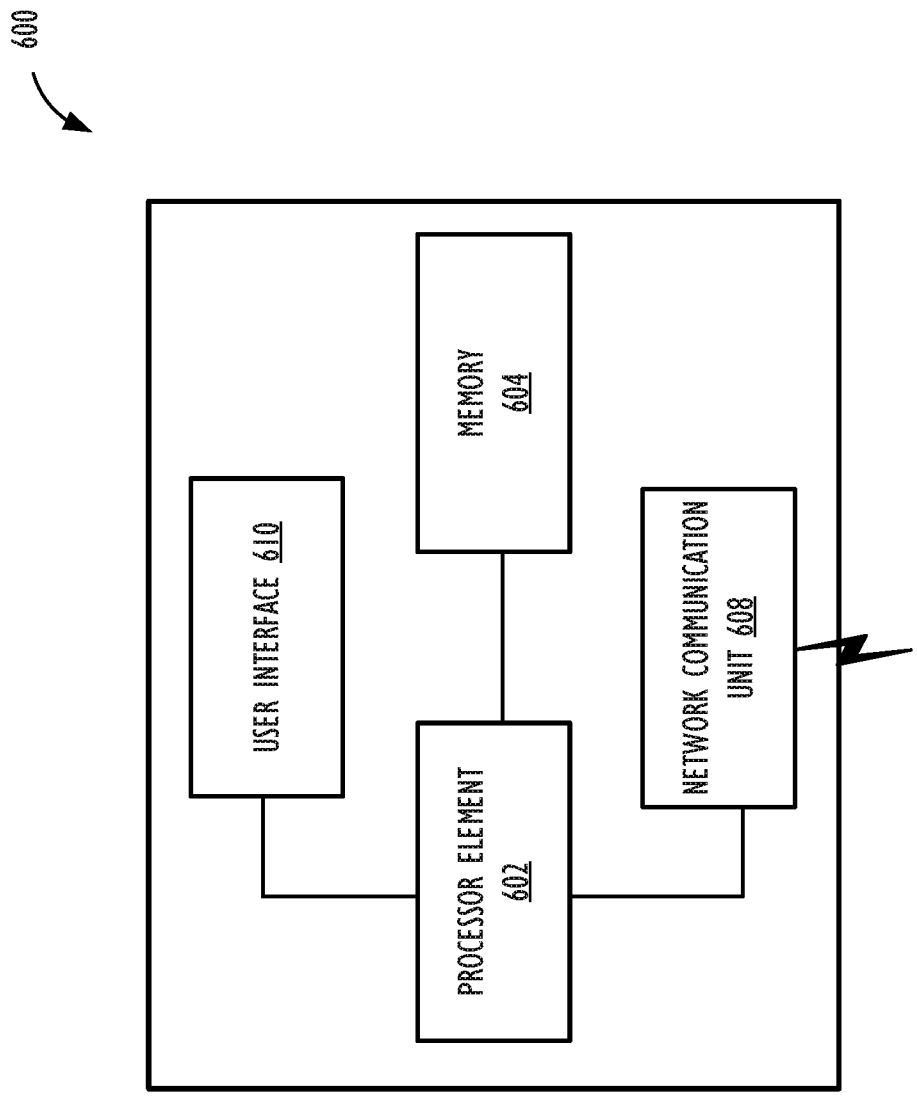
FIG. 6 is a block diagram illustrating another embodiment of computing system for use with techniques described herein.

Referring now to FIG. 6, a block diagram illustrates a computing device 600 that may be used for implementing the techniques described herein in accordance with one or more embodiments. For example, the computing device 600 illustrated in FIG. 6 could represent a client device or a physical server device. As shown in FIG. 6, the computing device 600 can include one or more input/output devices, such as a network communication unit 608 that could include a wired communication component and/or a wireless communications component, which can be coupled to processing element 602. The network communication unit 608 can utilized any of a variety of standardized network protocols, such as Ethernet, TCP/IP, to name a few of many protocols, to effect communications between devices and comprise one or more transceiver(s) that utilize the Ethernet, power line communication (PLC), WiFi, and/or other communication methods.

The computing system 600 includes a processing element 602 that contains one or more hardware processors, where each hardware processor may have a single or multiple processor cores. In one embodiment, the processing element 602 may include at least one shared cache that store data (e.g., computing instructions) that are utilized by one or more other components of processing element 602. For example, the shared cache may be locally cache data stored in a memory for faster access by components of the processing elements 602. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 6, the processing element 602 may also include one or more other types of hardware processing components, such as graphics processing units (GPU), application specific integrated circuits (ASICs), field-programmable gate arrays (FPGAs), and/or digital signal processors (DSPs).

FIG. 6 illustrates that memory 604 may be operatively coupled to processing element 602. Memory 604 may be a non-transitory medium configured to store various types of data. For example, memory 604 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 602. In one embodiment, the compiling process of the software program may transform program code written in a programming language to another computer language such that the processing element 602 is able to execute the programming code. For example, the compiling process of the software program may generate an executable program that provides encoded instructions (e.g., machine code instructions) for processor 902 to accomplish specific, non-generic, particular computing functions.

After the compiling process, the encoded instructions may then be loaded as computer executable instructions or process steps to processing element 602 from storage (e.g., memory 904) and/or embedded within the processing element 602 (e.g., cache). Processing element 602 can execute the stored instructions or process steps in order to perform instructions or process steps to transform the computing device into a non-generic, particular, specially programmed machine or apparatus. Stored data, e.g., data stored by a storage device, can be accessed by processing element 602 during the execution of computer executable instructions or process steps to instruct one or more components within the computing device 600.

A user interface 610 can include a display, positional input device (such as a mouse, touchpad, touchscreen, or the like), keyboard, or other forms of user input and output devices. The user interface 610 can be coupled to processor element 602. Other output devices that permit a user to program or otherwise use the computing device can be provided in addition to or as an alternative to network communication unit 908. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 900 may comprise other components well known in the art, such as sensors, powers sources, and/or analog-to-digital converters, not explicitly shown in FIG. 6. For ease of discussion, FIG. 6 explanation of these other components well known in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term about means ±10% of the subsequent number, unless otherwise stated.

Use of the term optionally with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system, comprising:
   a processor; and
   a memory, accessible by the processor, the memory storing instructions, that when executed by the processor, cause the processor to perform operations comprising:
   detecting that a first network device in a first network is affected by a security threat based on data produced by the first network device, wherein the first network comprises a first plurality of network devices including the first network device;
   in response to determining that the first network device is affected by a security threat:
   identifying a device type associated with the first network device;
   identifying a second network device in a second network having the device type, wherein the second network comprises a second plurality of network devices including the second network device; and
   implementing a security measure against the second network device based on a type of the security threat affecting the first network device.

2. The system of claim 1, wherein the operations comprise updating a service map associated with the second network device to indicate a health measure associated with the second network device.

3. The system of claim 2, wherein the health measure is based on the type of security threat.

4. The system of claim 2, wherein the service map comprises a map of a plurality of network devices, including the second network device.

5. The system of claim 1, wherein the first plurality of network devices perform one or more activities of a first workflow, and wherein the second plurality of network devices perform one or more activities of a second workflow.

6. The system of claim 1, wherein the security measure comprises updating one or more software resources associated with the second network device, quarantining the second network device, deploying anti-malware to the second network device, or a combination thereof.

7. The system of claim 1, wherein the device type is identified based on identifying information associated with the first network device.

8. The system of claim 7, wherein the identifying information comprises a make, a model, a configuration, or a combination thereof associated with the first network device.

9. A method, comprising:
   detecting, by one or more processors, that a first network device in a first network is affected by a security threat based on data produced by the first network device, wherein the first network comprises a first plurality of network devices including the first network device;

in response to determining that the first network device is affected by a security threat:
- identifying, by the one or more processors, a device type associated with the first network device;
- identifying, by the one or more processors, a second network device in a second network having the device type, wherein the second network comprises a second plurality of network devices including the second network device;
- implementing, by the one or more processors, a security measure against the second network device based on a type of the security threat affecting the first network device; and
- updating, by the one or more processors, a service map associated with the second network device to indicate a health measure associated with the second network device.

10. The method of claim 9, wherein the device type is identified based on a discovery message received by the first network device.

11. The method of claim 9, comprising receiving, by the one or more processors, the data produced by the first network device, wherein the device type is identified based on the data produced by the first network device.

12. The method of claim 9, wherein the device type comprises a type of functionality associated with the first network device and the second network device.

13. The method of claim 12, wherein the security measure comprises deploying anti-malware the second network device.

14. The method of claim 9, wherein the security threat comprises malware or an emerging threat of malware.

15. The method of claim 9, wherein the service map comprises a map of a plurality of network devices, including the second network device.

16. The method of claim 9, wherein the map of the plurality of network devices is configured to indicate the health measure associated with the second network device based on the type of security threat affecting the first network device.

17. A non-transitory, computer-readable medium, comprising instructions that when executed by one or more processors, cause the one or more processors to perform operations comprising:
- receiving data produced by a first network device in a first network;
- detecting that the first network device is affected by a security threat based on the data produced by the first network device;
- in response to determining that the first network device is affected by a security threat:
  - identifying a device type associated with the first network device based on the data produced by the first network device;
  - identifying a second network device in a second network having the device type; and
  - implementing a security measure against the second network device based on a type of the security threat affecting the first network device.

18. The non-transitory, computer-readable medium of claim 17, wherein the operations comprise updating a service map associated with the second network device to indicate a health measure associated with the second network device.

19. The non-transitory, computer-readable medium of claim 17, wherein a first plurality of network devices perform one or more activities of a first workflow, and wherein a second plurality of network devices perform one or more activities of a second workflow.

20. The non-transitory, computer-readable medium of claim 17, wherein the security measure comprises updating one or more software resources associated with the second network device, quarantining the second network device, deploying anti-malware to the second network device, or a combination thereof.

* * * * *